Nov. 13, 1928.
M. J. LONG
1,691,398
SHOCK ABSORBING BUMPER
Filed March 1, 1928
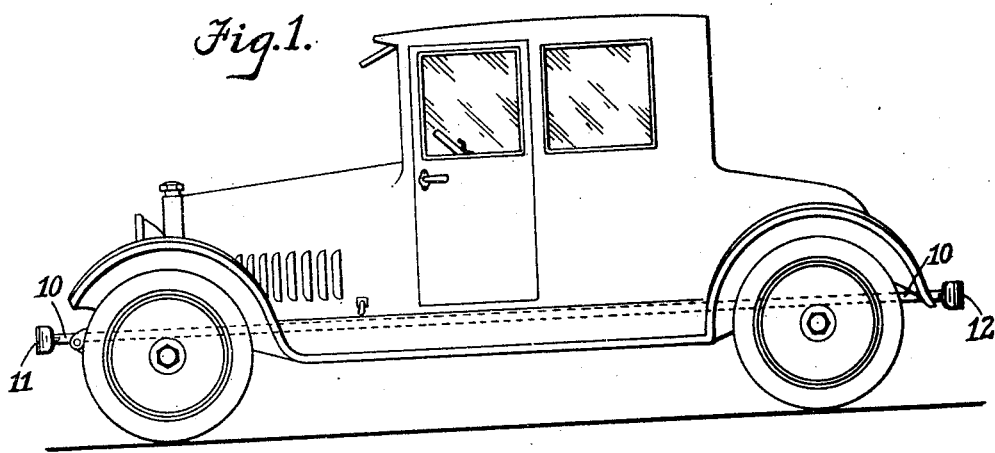
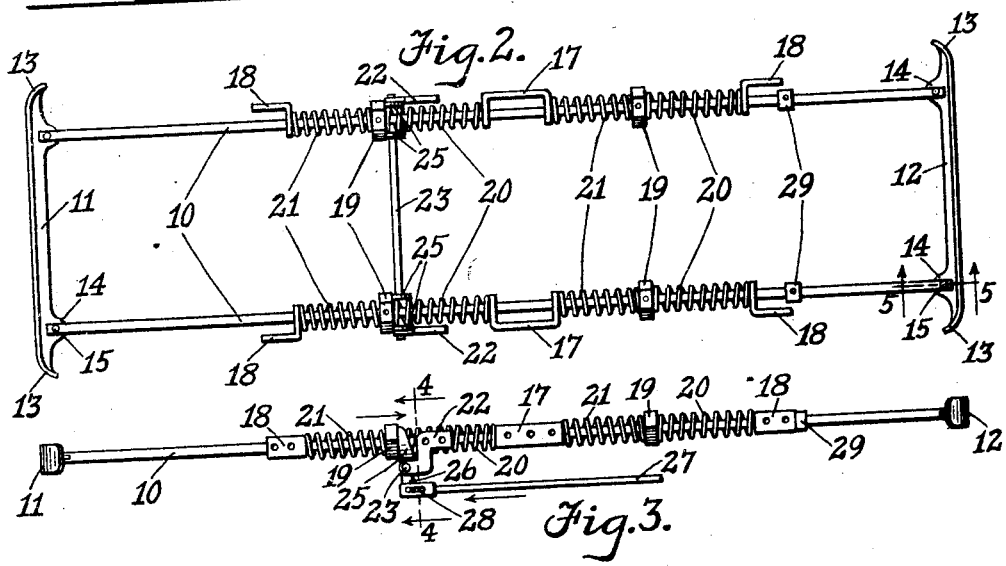
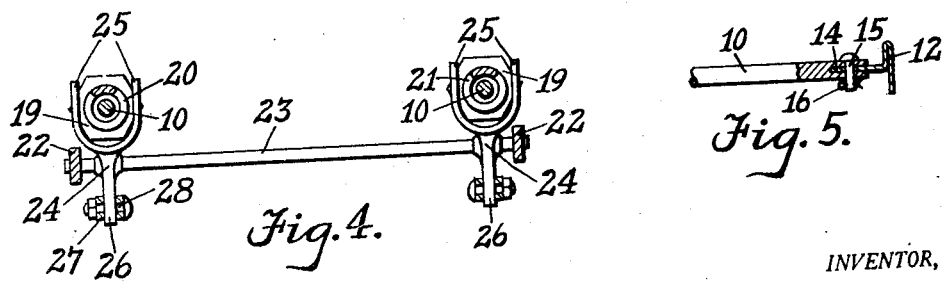
INVENTOR,
Melvin J. Long
BY A. K. Martell
ATTORNEY.

Patented Nov. 13, 1928.

1,691,398

UNITED STATES PATENT OFFICE.

MELVIN J. LONG, OF BREA, CALIFORNIA, ASSIGNOR OF ONE-HALF TO THOMAS H. COOPER, OF BREA, CALIFORNIA.

SHOCK-ABSORBING BUMPER.

Application filed March 1, 1928. Serial No. 258,160.

My invention relates to automobile accessories and more particularly to a bumper for motor vehicles.

The primary object of my invention is to provide a shock absorbing bumper which will protect both the rear and front ends of a vehicle which is equipped therewith.

A further object is to provide a shock absorbing bumper for motor vehicles which automatically will apply the emergency brakes of a vehicle equipped therewith, when impact is made with the forward end of the bumper.

A further object is to provide a combination bumper and brake operator, of the character described, which readily may be applied to any of the various forms and makes of automobiles, motor buses, trucks and the like.

Other objects and advantages will appear hereinafter and while I show herewith and will describe a preferred form of construction, I desire it to be understood that I do not limit myself to such preferred form but that various changes and adaptations may be made therein without departing from the spirit of my invention as hereinafter claimed.

Referring to the drawing which accompany this specification and form a part thereof.

Fig. 1 is a left side view of an automobile which is equipped with a shock absorbing bumper embodying the principles of my invention.

Fig. 2 is a plan view of my shock absorbing bumper, by itself, with suitable brackets for attaching it to an automobile frame or body.

Fig. 3 is a side view of the shock absorbing bumper shown in Fig. 2.

Fig. 4 is an enlarged transverse sectional view of the bumper shown in Figs. 2 and 3, taken on line 4—4 of Fig. 3.

Fig. 5 is an enlarged fragmentary sectional view of one corner of the bumper, taken on line 5—5 of Fig. 2, to show the pivotal connection between the side or thrust bars and the end or impact bars thereof.

Considered more in detail the drawings will be seen to show my shock absorbing bumper as made up of two equal side bars or thrust bars 10, somewhat longer than the vehicle upon which the bumper is used, and two equal end bars or impact bars 11 and 12 pivotally attached to the ends of bars 10 so as to form a loose-jointed frame of the general shape of an elongated parallelogram, as shown in Fig. 2. Side bars 10 preferably are made of round rod metal sufficiently heavy and stiff to withstand a considerable end thrust without bending appreciably, and transverse bars 11 and 12 are made of heavy sheet metal folded as shown in Fig. 5, or of plate or bar metal sufficiently heavy to withstand such impact as bumpers are ordinarily subjected to. The ends 13 of bars 11 and 12 are curved toward the center of the frame, in the usual way, and pivot lugs 14 are formed in such spaced relation to the ends as to bring side bars 10 on the inner side of the side bars of the automobile frame. The ends of side bars 10 are slotted to receive lugs 14 and coinciding holes are made in said slotted ends and said lugs 14 through which pivot pins 15 are inserted, said pivot pins being provided with cotter pins 16 to prevent them from working out.

A double bracket 17 and two single brackets 18 are associated with each of said side bars 10, said brackets being adapted to attach side bars 10 to the frame or body of the vehicle and to serve as bearings through which side bars 10 are free to work longitudinally. Double brackets 17 are placed at the middle of bars 10 and single brackets 18 are placed in equally spaced relation thereto. Hexagonal collars 19 are fixed on side bars 10, midway between brackets 17 and 18, and rather stiff helical springs 20 and 21 are mounted on side bars 10, between said collars 19 and said brackets 17 or 18, so that each of the springs is under slight compression between one of the collars and one of the brackets.

A pair of supporting brackets 22, adapted to be attached to the frame or body of the vehicle, adjacent the forward collars 19 on side bars 10, are provided to hold a transverse shaft 23 therebelow whose ends are journaled in said brackets 22, and a pair of vertical lever arms 24 having bifurcated upper ends 25 which extend upwardly at the sides of springs 20 and make contact with the rear side of forward rollers 19 are rigidly fixed on shaft 23. The lower ends 26 of said lever arms 24 which extend below shaft 23, are pivotally attached to connecting rods 27, adapted to connect said arms 24 to the usual emergency brakes (not shown). The connecting rods 27 are provided with slots 28 to permit sufficient play of the pivot pin therein to allow free operation of the brakes by the usual means (not shown). Stop collars 29 are fixed on side bars 10, rearwardly from rear brackets 18 and in spaced relation thereto, to limit the forward movement of side bars 10.

The operation of my combination bumper and brake operator, it will be seen, is entirely automatic. When impact is made with front bar 11 side bars 10 are thrust rearwardly through brackets 17 and 18, which causes further compression of springs 20, on the rear side of collars 19, and simultaneously causes arms 24 with shaft 23 to turn in brackets 22 so as to apply the emergency brakes, as is indicated in Fig. 3. As soon as the pressure is removed from front bar 11, springs 20 operate to reverse the movement of side bars 10, thus restoring them and impact bars 11 and 12 to their normal positions and releasing the emergency brakes. Arms 24 being fixed on shaft 23 so that both must turn when either is actuated, it is evident that the emergency brakes will be applied whether impact is made squarely on front bar 11 so as to operate both side bars 10 or is made at either end of front bar 11 so as to operate only one of the side bars 10. When impact is made with rear bar 12 side bars 10 are thrust forwardly through brackets 17 and 18, which causes further compression of springs 21, on the front side of collars 19 without actuating arms 24, such movement being limited by contact of stop collars 29 with rear brackets 18. In case it should happen that impact is made with both front and rear bars 11 and 12 at the same time, it is evident that the shock will be transmitted through side bars 10 without damage to the vehicle which is equipped with this bumper.

Having thus illustrated and described my invention, I claim:

1. A shock-absorbing bumper for automobiles comprising a pair of side bars, a pair of end bars pivotally connected to the ends of said side bars so as to form a loose-jointed frame in the shape of an elongated parallelogram; a series of brackets associated with said side bars for attaching them to the frame or body of an automobile, said brackets serving also as bearings through which said side bars are adapted to work longitudinally; collars fixed on said side bars between said brackets; helical springs mounted on said side bars, between said brackets and said collars; upstanding lever arms pivotally mounted adjacent the forward pair of said collars so as to be automatically actuated thereby, when said side bars 10 are moved rearwardly, and connecting rods pivotally attached to said lever arms, said connecting rods being adapted to connect said lever arms to the emergency brakes of an automobile, said levers having bifurcated upper ends between which said side bars extend and against which said collars operate.

2. A combination bumper and brake operator for motor vehicles comprising a frame having two parallel side bars serving as thrust bars and two parallel end bars serving as impact bars, said end bars being pivotally attached to the ends of said side bars; a double bracket and two single brackets associated with each of said side bars, said brackets being adapted to attach said frame to the body or frame of an automobile and to serve as bearings through which said side bars may work longitudinally; collars fixed on said side bars between said double brackets and said single brackets; helical springs mounted on said side bars between said collars and said brackets; a transverse shaft below said side bars and adjacent the forward pair of said collars, said shaft being supported by brackets adapted to attach it to the body or frame of the automobile; vertical lever arms fixed on said shaft, adjacent said forward collars, so that their upper ends make contact with the rear sides thereof and their lower ends project below said shaft; connecting rods attached to the lower ends of said lever arms, said connecting rods being adapted to connect said lever arms with the emergency brakes of a motor vehicle, and stop collars fixed on said side bars so as to limit their forward movement.

3. In a device of the class described, the combination, with the frame and emergency brakes of a vehicle; of an impact bar, a thrust bar in operative relation to said impact bar, a collar on said thrust bar, an upright lever having a bifurcated upper portion which includes said thrust bar and is in an operative relation to said collar, and means operatively connecting said lever with the aforementioned emergency brakes.

MELVIN J. LONG.